(12) United States Patent
Tai et al.

(10) Patent No.: US 11,879,086 B2
(45) Date of Patent: Jan. 23, 2024

(54) HIGH INTERNAL PHASE EMULSION STABILIZED BY LOW CONTENT OF SURFACTANT AND PREPARATION METHOD THEREOF

(71) Applicant: CHINA RESEARCH INSTITUTE OF DAILY CHEMISTRY CO., LTD, Taiyuan (CN)

(72) Inventors: Xiumei Tai, Taiyuan (CN); Qian Chen, Taiyuan (CN); Yanyun Bai, Taiyuan (CN); Zeyun Yang, Taiyuan (CN); Tianzhuang Wang, Taiyuan (CN); Yanjun Ma, Taiyuan (CN)

(73) Assignee: CHINA RESEARCH INSTITUTE OF DAILY CHEMISTRY CO., LTD, Taiyuan (CN)

( * ) Notice: Subject to any disclaimer, the term of this patent is extended or adjusted under 35 U.S.C. 154(b) by 90 days.

(21) Appl. No.: 17/401,773

(22) Filed: Aug. 13, 2021

(65) Prior Publication Data

US 2022/0054999 A1    Feb. 24, 2022

(30) Foreign Application Priority Data

Aug. 21, 2020  (CN) .......................... 202010849320.X

(51) Int. Cl.
*C09K 23/42* (2022.01)
*C09K 23/00* (2022.01)
*B01F 23/41* (2022.01)

(52) U.S. Cl.
CPC .......... *C09K 23/42* (2022.01); *B01F 23/4141* (2022.01); *C09K 23/00* (2022.01)

(58) Field of Classification Search
CPC .......... C09K 23/42; C08G 65/26–2615; B01F 23/4141
See application file for complete search history.

(56) References Cited

U.S. PATENT DOCUMENTS

2003/0170193 A1 * 9/2003 Pate .......................... A61K 8/37
424/70.12
2008/0311211 A1 * 12/2008 Leser ................... A23D 7/0053
977/773

FOREIGN PATENT DOCUMENTS

EP           2647297 A2 * 10/2013 ........... A23K 20/158
WO     WO-2021085197 A1 *  5/2021 ............. A61K 8/064

OTHER PUBLICATIONS

Chen, Q. et al. High Internal Phase Emulsions Synergistically Stabilized by Sodium Carboxymethyl Cellulose and Palm Kernel Oil Ethoxylates as an Essential Oil Delivery System. Journal of Agricultural and Food Chemistry, 2021, 69, 4191-4203. (Year: 2021).*

Chen, Q. et al. High internal phase emulsions solely stabilized by natural oil-based nonionic surfactants as tea tree oil transporter. Colloids and Surfaces A: Physiochemical and Engineering Aspects, 2021, 616, 126320. (Year: 2021).*

* cited by examiner

*Primary Examiner* — Stephen E Rieth
(74) *Attorney, Agent, or Firm* — WPAT, P.C

(57) ABSTRACT

A high internal phase emulsion stabilized by a low content of surfactant and its preparation method thereof are provided. An oil ethoxylate is added to a vegetable oil, and the resulting mixture is uniformly mixed under a low-speed stirring at room temperature. Water is added dropwise to the mixture of surfactant and vegetable oil under stirring, and a homogenization is performed on the obtained dispersed system by a high-shear dispersion emulsification homogenizer to obtain the high internal phase emulsion stabilized by oil ethoxylate. The preparation method requires a low content of surfactant, mild preparation conditions and simple operations. When the oil-phase volume fraction is 83 vol %, the minimum mass fraction of the oil ethoxylate to stabilize the high internal phase emulsion is 0.6 wt %, and the prepared oil-in-water type high internal phase emulsion has excellent stability and shows bright color, delicate odor, hydra feel and being easy to apply.

9 Claims, 4 Drawing Sheets

HIGH INTERNAL PHASE EMULSION STABILIZED BY LOW CONTENT OF SURFACTANT AND PREPARATION METHOD THEREOF

TECHNICAL FIELD

The invention relates to the technical field of high internal phase emulsion preparation and development, and more specifically to a high internal phase emulsion stabilized by an extremely small amount of surfactant and a preparation method thereof.

BACKGROUND

High internal phase emulsion (HIPE) has been widely used in foods, biological medicines and materials. Generally, HIPE is defined as an emulsion with an internal phase volume fraction higher than 74.04%. When the internal phase volume fraction is less than 74%, the dispersed phase still maintains an intact spherical structure; if the dispersed phase volume fraction continuously increases up to 74.04%, the dispersed phase droplets are closely packed and interconnected but the droplets do not deform; when the dispersed phase volume fraction further increases and exceeds 74.04%, the droplets squeeze among each other and are separated by interfacial films adsorbed at oil-water interfaces and thin films of continuous phase, thereby forming polyhedral cells.

Since high internal phase volume fraction is prone to inducing phase inversion, the selection of emulsifiers is particularly important for HIPEs. In recent decades, solid particles have been extensively used to stabilize HIPEs. For example, Jiao et al. (B. Jiao, A. Shi, Q. Wang and B. P. Binks, "High-Internal-Phase Pickering Emulsions Stabilized Solely by Peanut-Protein-Isolate Microgel Particles with Multiple Potential Applications", *Angewandte Chemie International Edition*, 2018, 57, 9274-9278) uses 1.5 wt % peanut protein to separate microgel particles, and when pH is adjusted to 9, the peanut oil with a volume fraction up to 87% can be stabilized. Chinese invention patent publication No. CN102391416A discloses an oil-in-water type HIPE stabilized by inorganic nano-titanium dioxide, in which nano-titanium dioxide particles with a mass fraction of 1-5% (wt %) are used as a stabilizer to stabilize the oil-in-water type HIPE. At present, extensive research associated with HIPE has been conducted, which are almost about the emulsions stabilized by solid particles and a large amount of surfactant. When solid particles are used as a stabilizer, it is necessary to perform complex modifications on the solid particles because the wettability of the solid particles determines their adsorbed ability at oil-water interfaces. For traditional HIPEs stabilized by small molecule surfactant, surfactant which can only be dissolved in the continuous phase are generally selected, and usually need very large amount, generally 5-50% (wt %) (J. M. Williams, "High Internal Phase Water-in-Oil Emulsions: Influence of Surfactants and Cosurfactants on Emulsion Stability and Foam Quality", *Langmuir*, 1991, Vol. 7, 1370-1377; A. Barbetta and N. R. Cameron, "Morphology and Surface Area of Emulsion-Derived (PolyHIPE) Solid Foams Prepared with Oil-Phase Soluble Porogenic Solvents: Three-Component Surfactant System", *Macromolecules*, 2004, Vol. 37, 3202-3213). Large amounts of surfactant may increase cost and restrict subsequent application. Therefore, seeking for a stable HIPE prepared with an extremely small amount of surfactant is a current research hotspot. However, there are very few studies on HIPEs stabilized by less amount of small molecule surfactant.

Oil-based surfactant is synthesized by one-step method, in which ethoxy group from ring opening of ethylene oxide is inserted between carbonyl group and alkoxy group of renewable natural oils and their derivatives under the action of an ethoxy-inserted catalyst. (Tao Yongduo, China Research Institute of Daily Chemical Industry, Taiyuan, Shanxi, P. R. China, June 2015). As a novel ester-ether type nonionic surfactant, oil-based surfactant mostly has mild properties, high safety and low irritation, and is rapidly biodegraded, which meets the requirements of green, environmental protection and sustainable development.

SUMMARY

In view of the existing HIPE stabilized by surfactant having the technical problems of requiring a large amount of surfactant and complicated preparation process, etc., the invention aims to provide a HIPE stabilized by a low content of surfactant and a preparation method thereof.

In the invention, the HIPE is prepared by using an oil ethoxylate as a stabilizer. The HIPE with a volume fraction of oil phase up to 83% (vol %) can be stabilized by an extremely less amount of oil ethoxylate (the minimum amount can be only 0.6% (wt %)), which is much lower than the mass fraction (5-50% (wt %)) of small molecule surfactant required to form the HIPE in the prior art. An extremely small amount of oil ethoxylate is required to form the HIPE, and the minimum amount thereof can be only 0.6% (wt %), which is much lower than the mass fraction (5-50% (wt %)) of small molecule surfactant required to form the HIPE in the prior art, and can stabilize the oil phase with a volume fraction up to 83% (vol %). Moreover, the prepared HIPE is highly stable and has sensory characteristics such as bright color, luster, delicate odor, being easy to apply, and being refreshing and moisturizing. Therefore, the HIPE prepared by using an oil ethoxylate shows a broad application prospect in the development of novel personal care products.

The invention provides a HIPE stabilized by a low content of surfactant which is an oil ethoxylate with the mass concentration of 0.6-2.0 wt %.

In the above technical solution, the oil ethoxylate includes one or two selected from the group consisting of a palm kernel oil ethoxylate, a soybean oil ethoxylate, and a coconut oil ethoxylate. When two oil ethoxylates are selected, a ratio of the two oil ethoxylates is (0.5-2):(0.5-2).

The invention provides a method for preparing the above HIPE stabilized by a low content of surfactant, including the following steps:

(1) mixing the oil ethoxylate with a vegetable oil, and stirring at 10-50° C. until a resulting solution is mixed evenly;

(2) slowly adding water dropwise to the resulting solution of the oil ethoxylate and the vegetable oil under stirring;

(3) performing a homogenization on an obtained dispersed system by a high-shear dispersion emulsification homogenizer (i.e., a kind of emulsification homogenizer), to obtain the HIPE.

In an embodiment, the vegetable oil in step (1) is one of a soybean oil, a rapeseed oil, a coconut oil, an olive oil, a sunflower oil, a sesame oil, and a peanut oil.

In an embodiment, a volume fraction of the vegetable oil in step (1) is 74-88 vol %.

In an embodiment, process conditions in step (1) include: a temperature of 10-50° C., a low-speed stirring speed of 1000-4000 rpm, and stirring time of 5-10 min.

In an embodiment, in step (2), a stirring speed is 5000-8000 rpm, and the water is dropwise added to the resulting solution of step (1) at a speed of 0.4-0.8 mL/min.

In an embodiment, in the homogenization process of step (3), the homogenization is performed at a speed of 8000-12000 rpm for 8-15 min.

In another embodiment, the invention provides an HIPE stabilized by an oil ethoxylate which is prepared by the above method.

The invention may have the following advantages:
(1) In the invention, the HIPE stabilized by oil ethoxylate is prepared, where less amount of surfactant is used. The minimal mass concentration 0.6% (wt %) of the surfactant in the emulsion can stabilize the oil phase with a volume fraction up to 83% (vol %).
(2) In the invention, the surfactant, i.e., oil ethoxylate, for stabilizing the HIPE, derives from lipophilic raw materials such as natural oils and their derivatives, and has the merits of wide raw material sources, renewable, mild properties, high safety without irritation, and rapid biodegradation.
(3) The oil-in-water type HIPE stabilized by oil ethoxylate according to the invention has a smooth surface, and is uniformly emulsified, free of impurities, and absence of oil-water layering phenomenon. Moreover, the emulsion has sensory characteristics including bright color, luster, delicate odor, being easy to apply, and good lubrication.

DETAILED DESCRIPTION OF THE EMBODIMENTS

The invention is further illustrated by the following embodiments, but is not limited thereto.

Embodiment 1

The embodiment 1 of the invention provides a method for preparing a HIPE stabilized by an oil ethoxylate, including the following steps:
(1) a palm kernel oil ethoxylate with a mass fraction of 1.0% is weighed;
(2) a soybean oil with a volume fraction of 74% is weighed;
(3) the palm kernel oil ethoxylate and the soybean oil in steps (1) and (2) are mixed uniformly at 3000 rpm at 15° C.;
(4) deionized water with a volume fraction of 26% is accurately taken;
(5) the water in step (4) is added dropwise to the mixture in step (3) at 6000 rpm;
(6) a homogenization is performed on the dispersed system obtained in step (5) with a high-shear dispersion emulsification homogenizer at 10000 rpm for 10 min to obtain an HIPE stabilized by the palm kernel oil ethoxylate.

Figure 1:
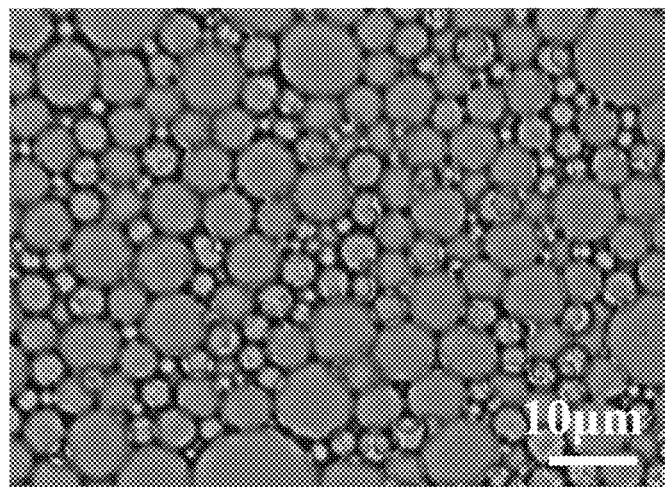
FIG. 1 shows an optical microscopy image of the freshly prepared HIPE obtained in Embodiment 1.
Figure 2:
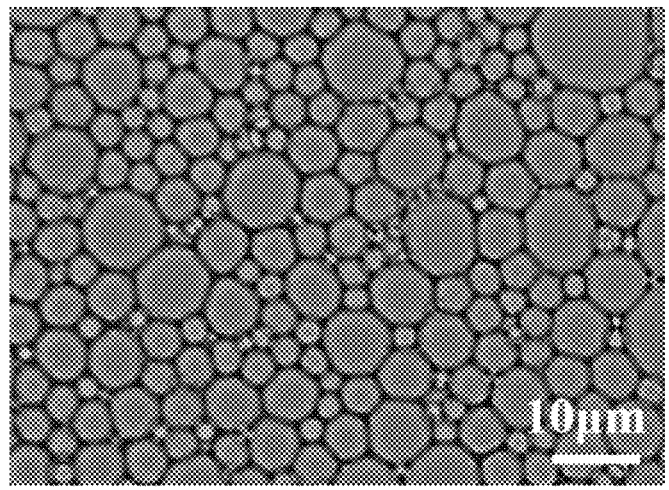
FIG. 2 shows an optical microscopy image of the HIPE obtained in Embodiment 1 after the emulsion is placed for one month.

In Embodiment 1, the soybean oil in step (2) with different volume fractions including 74%, 77%, 80%, 83%, 86%, and 88% (vol %) is used to obtain HIPEs with different oil-phase volume fractions stabilized by a constant mass fraction of palm kernel oil ethoxylate, thereby investigating the effect of oil-water ratio on the stability of the formed HIPE. The optical microscopy image of the freshly prepared HIPE is shown in FIG. 1, and the optical microscopy image of the HIPE after the emulsion is placed at 25° C. for one month is shown in FIG. 2. When the mass concentration of palm kernel oil ethoxylate is 1% (wt %), and the volume fraction of the stabilized soybean oil is 83% (vol %), the prepared emulsion maintains good stability after being placed at 25° C. for six months. Its heat-resistant stability and cold-resistant stability are shown in Table 1. It can be seen from FIG. 1 and FIG. 2 that the prepared emulsion maintains good stability during storage.

FIG. 1 shows the HIPE in Embodiment 1 freshly prepared by a homogenization at 15° C. and a rotating speed of 10000 rpm for 10 min using the palm kernel oil ethoxylate with a mass fraction of 1.0% (wt %) and the oil phrase with a volume fraction of 83% (vol %). FIG. 2 shows the optical microscopy image of the HIPE in Embodiment 1 prepared by a homogenization at 15° C. and a rotating speed of 10000 rpm for 10 min using the palm kernel oil ethoxylate with a mass fraction of 1.0% (wt %) and the oil phrase with a volume fraction of 83% (vol %) after the emulsion is placed for one month.

Embodiment 2

The embodiment 2 of the invention provides a method for preparing a HIPE stabilized by an oil ethoxylate, including the following steps:
(1) a rapeseed oil with a volume fraction of 83% is weighed;
(2) a palm kernel oil ethoxylate with a mass fraction of 0.4% (wt %) is weighed;
(3) the rapeseed oil and the palm kernel oil ethoxylate in steps (1) and (2) are mixed uniformly at 3000 rpm at 25° C.;
(4) deionized water with a volume fraction of 17% is accurately taken;
(5) the water in step (4) is added dropwise to the mixture in step (3) at a 6000 rpm;

(6) a homogenization is performed on the dispersed system obtained in step (5) with a high-shear dispersion emulsification homogenizer at a 10000 rpm for 10 min to obtain a HIPE stabilized by the palm kernel oil ethoxylate.

Figure 3:
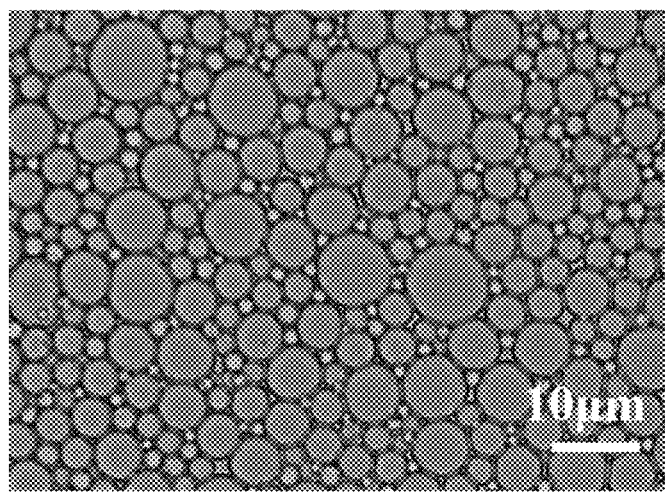
FIG. 3 shows an optical microscopy image of the freshly prepared HIPE obtained in Embodiment 2.
Figure 4:
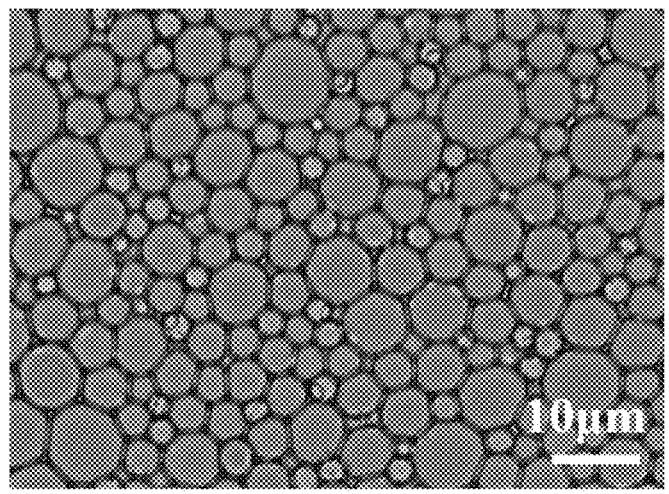
FIG. 4 shows an optical microscopy image of the HIPE obtained in Embodiment 2 after the emulsion is placed for one month.

In Embodiment 2, the palm kernel oil ethoxylate in step (2) with different mass concentrations including 0.4%, 0.6%, 0.8%, 1.0%, and 1.5% (wt %) is used to obtain HIPEs stabilized by different mass fractions of palm kernel oil ethoxylates, thereby investigating the effect of palm kernel oil ethoxylate concentration on the stability of the emulsion. The optical microscopy image of the freshly prepared high internal phase emulsion is shown in FIG. 3, and the optical microscopy image of the HIPE after the emulsion is placed for one month is shown in FIG. 4. When the mass concentration of the palm kernel oil ethoxylate is 0.6% (wt %), the volume fraction of the stabilized rapeseed oil is 83% (vol %), and the prepared emulsion maintains good stability after being placed at 25° C. for six months. Its heat-resistant stability and cold-resistant stability are shown in Table 1. It can be seen from FIG. 3 and FIG. 4 that the prepared emulsion maintains good stability during storage.

The HIPE with a constant oil-phase volume fraction of 83% (vol %) in Embodiment 2 is prepared by a homogenization at 25° C. and a rotating speed of 10000 rpm for 10 min using the palm kernel oil ethoxylate respectively with a mass concentration of 0.4%, 0.6%, 0.8%, 1.0%, and 1.5% (wt %). FIG. 3 shows the optical microscopy image of the freshly prepared HIPE with 0.6% (wt %) of the palm kernel oil ethoxylate and the oil-phase volume fraction of 83% (vol %), and FIG. 4 shows the optical microscopy image of the HIPE with 0.6% (wt %) of the palm kernel oil ethoxylate and the oil-phase volume fraction of 83% (vol %) after the emulsion is placed for one month.

Embodiment 3

The embodiment 3 of the invention provides a method for preparing a HIPE stabilized by an oil ethoxylate, including the following steps:
 (1) an oil ethoxylate with a mass fraction of 0.6% (wt %) is weighed;
 (2) a coconut oil with a volume fraction of 83% (vol %) is weighed;
 (3) the oil ethoxylate and the coconut oil in steps (1) and (2) are mixed uniformly at 3000 rpm at 30° C.;
 (4) tri-distilled water with a volume fraction of 17% is accurately taken;
 (5) the water in step (4) is added dropwise to the mixture in step (3) at 6000 rpm;
 (6) a homogenization is performed on the dispersed system obtained in step (5) with a high-shear dispersion emulsification homogenizer at 10000 rpm for 10 min to obtain the HIPE stabilized by the oil ethoxylate.

In Embodiment 3, the oil ethoxylate in step (1) of the same series including a coconut oil ethoxylate, a palm kernel oil ethoxylate, and a soybean oil ethoxylate is used to obtain HIPEs stabilized by oil ethoxylate of the same serious, thereby investigating the effect of the types of surfactant on the stability of the HIPE. The optical microscopy image of the freshly prepared emulsion and the optical microscopy image of the emulsion after being placed at 25° C. for one month are observed and shown in FIG. 5 and FIG. 6. When the surfactant is the soybean oil ethoxylate, the prepared emulsion still maintains good stability after being placed at 25° C. for six months, and its heat-resistant stability and cold-resistant stability are shown in Table 1. It can be seen from FIG. 5 and FIG. 6 that the prepared emulsion maintains good stability during storage.

Figure 5:
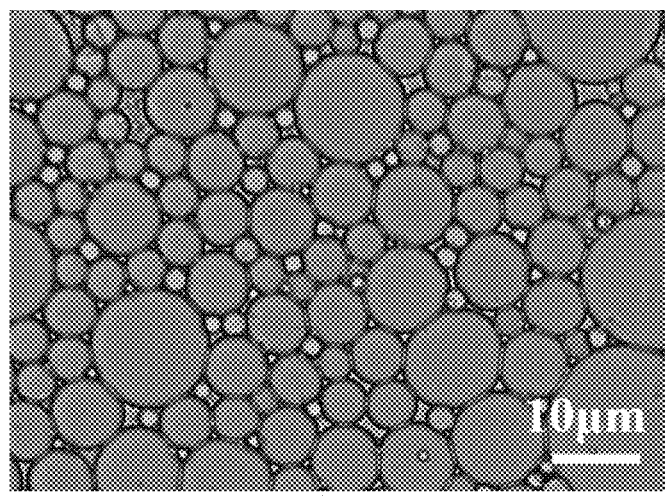
FIG. 5 shows an optical microscopy image of the freshly prepared HIPE obtained in Embodiment 3.
Figure 6:
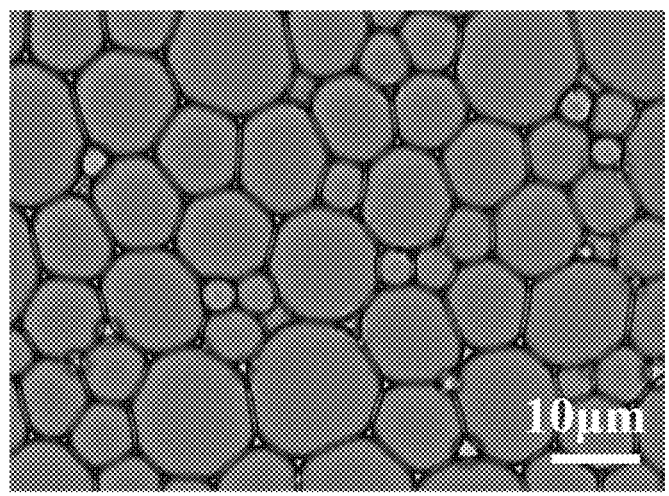
FIG. 6 shows an optical microscopy image of the HIPE obtained in Embodiment 3 after the emulsion is placed for one month.

The HIPEs in Embodiment 3 are prepared by a homogenization at 30° C. and a rotating speed of 10000 rpm for 10 min, wherein the HIPEs have a constant oil-phase volume fraction of 83% (vol %) and 0.6% (wt %) of the oil ethoxylate selected from the coconut oil ethoxylate, the palm kernel oil ethoxylate, or the soybean oil ethoxylate. FIG. 5 shows the optical microscopy image of the freshly prepared HIPE with 0.6% (wt %) of the soybean oil ethoxylate and the oil-phase volume fraction of 83% (vol %), and FIG. 6 shows the optical microscopy image of the HIPE with 0.6% (wt %) of the soybean oil ethoxylate and the oil-phase volume fraction of 83% (vol %) after the emulsion is placed for one month.

Embodiment 4

The embodiment 4 of the invention provides a method for preparing a HIPE stabilized by an oil ethoxylate, including the following steps:
 (1) an oil ethoxylate with a total mass fraction of 0.6% (wt %) is accurately weighed, where a palm kernel oil ethoxylate is accounted for 0.3% (wt %) and a coconut oil ethoxylate is accounted for 0.3% (wt %);
 (2) a sunflower oil with a volume fraction of 83% (vol %) is weighed;
 (3) the oil ethoxylate and the sunflower oil in steps (1) and (2) are mixed uniformly at 3000 rpm at 35° C.;
 (4) deionized water with a volume fraction of 17% is accurately taken;
 (5) the water in step (4) is added dropwise to the mixture in step (3) at 6000 rpm;
 (6) a homogenization is performed on the dispersed system obtained in step (5) with a high-shear dispersion emulsification homogenizer at 10000 rpm for 10 min to obtain the HIPE stabilized by the oil ethoxylate.

In Embodiment 4, the palm kernel oil ethoxylate and the coconut oil ethoxylate in step (1) are used at different ratios including 1:0.5, 1:1, and 1:2 to obtain HIPEs co-stabilized by the palm kernel oil ethoxylate and the coconut oil ethoxylate, thereby investigating the effect of the ratio of the palm kernel oil ethoxylate to the coconut oil ethoxylate on the stability of the HIPE. The optical microscopy image of the freshly prepared emulsion and the optical microscopy image of the emulsion after being placed at 25° C. for one month are observed and shown in FIG. 7 and FIG. 8. When the ratio of the palm kernel oil ethoxylate to the coconut oil ethoxylate is 1:1, the prepared emulsion still maintains good stability after being placed at 25° C. for four months, and its heat-resistant stability and cold-resistant stability are shown in Table 1. It can be seen from FIG. 7 and FIG. 8 that the prepared emulsion maintains good stability during storage.

Figure 7:
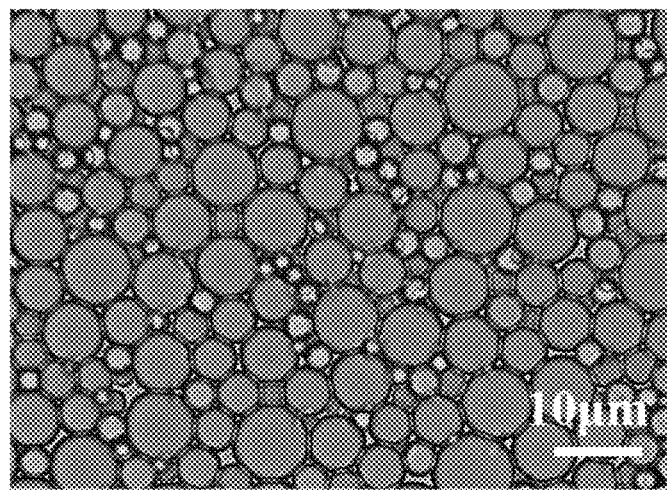
FIG. 7 shows an optical microscopy image of the freshly prepared HIPE obtained in Embodiment 4.
Figure 8:
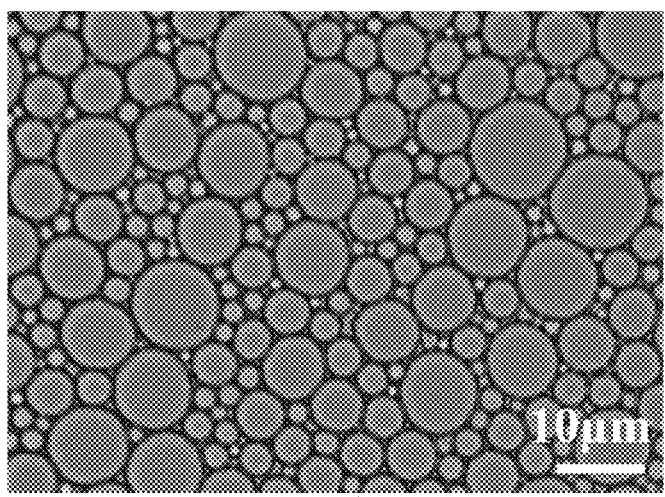
FIG. 8 shows an optical microscopy image of the HIPE obtained in Embodiment 4 after the emulsion is placed for one month.

The HIPEs co-stabilized by the palm kernel oil ethoxylate and the coconut oil ethoxylate in Embodiment 4 are prepared by a homogenization at 35° C. and a 10000 rpm for 10 min, wherein the HIPEs have a constant oil-phase volume fraction of 83% (vol %), and 0.6% (wt %) of the oil ethoxylate composed of the palm kernel oil ethoxylate and the coconut oil ethoxylate at the ratios of 1:0.5, 1:1, and 1:2, respectively. FIG. 7 shows the optical microscopy image of the freshly prepared HIPE co-stabilized by the palm kernel oil ethoxylate and the coconut oil ethoxylate at the ratio of 1:1, and FIG. 8 shows the optical microscopy image of the HIPE co-stabilized by the palm kernel oil ethoxylate and the coconut oil ethoxylate at the ratio of 1:1 after the emulsion is placed for one month.

Embodiment 5

The embodiment 5 of the invention provides a method for preparing a HIPE stabilized by an oil ethoxylate, including the following steps:
(1) an oil ethoxylate with a total mass fraction of 2.0% (wt %) is accurately weighed, where a palm kernel oil ethoxylate is accounted for 1% (wt %) and a soybean oil ethoxylate is accounted for 1% (wt %);
(2) a sunflower oil with a volume fraction of 83% (vol %) is weighed;
(3) the oil ethoxylate and the sunflower oil in steps (1) and (2) are mixed uniformly at of 3000 rpm at 45° C.;
(4) deionized water with a volume fraction of 17% is accurately taken;
(5) the water in step (4) is added dropwise to the mixture in step (3) at 6000 rpm;
(6) a homogenization is performed on the dispersed system obtained in step (5) with a high-shear dispersion emulsification homogenizer at 10000 rpm for 10 min to obtain the HIPE stabilized by the oil ethoxylate.

In Embodiment 5, the palm kernel oil ethoxylate and the soybean oil ethoxylate in step (1) are used at different ratios including 1:0.5, 1:1, and 1:2 to obtain HIPEs co-stabilized by the palm kernel oil ethoxylate and the soybean oil ethoxylate, thereby investigating the effect of the ratio of the palm kernel oil ethoxylate to the soybean oil ethoxylate on the stability of the HIPE. The optical microscopy image of the freshly prepared emulsion and the optical microscopy image of the emulsion after being placed for one month are observed and shown in FIG. 9 and FIG. 10. When the ratio of the palm kernel oil ethoxylate to the soybean oil ethoxylate is 1:1, the prepared emulsion still maintains good stability after being placed at 25° C. for four months, and its heat-resistant stability and cold-resistant stability are shown in Table 1. It can be seen from FIGS. 9 and 10 that the prepared emulsion maintains good stability during storage.

Figure 9:
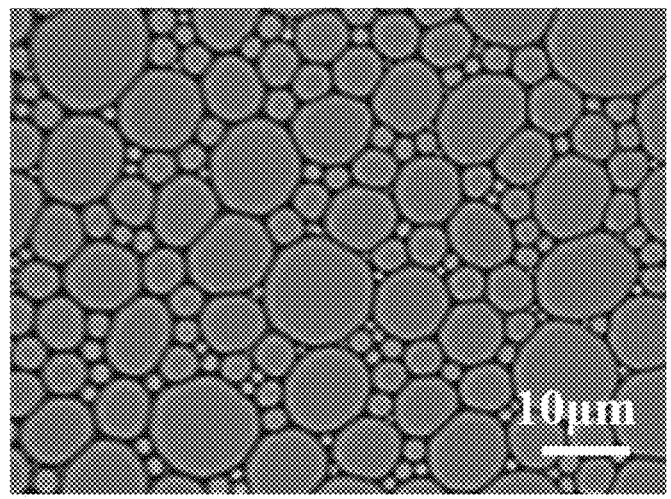
FIG. 9 shows an optical microscopy image of the freshly prepared HIPE obtained in Embodiment 5.
Figure 10:
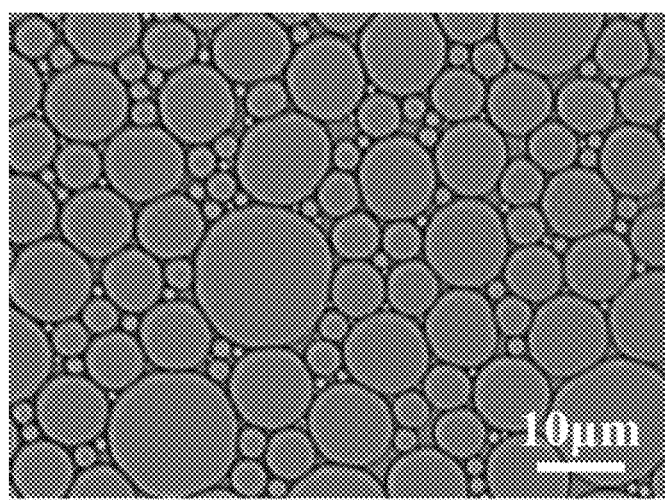
FIG. 10 shows an optical microscopy image of the HIPE obtained in Embodiment 5 after the emulsion is placed for one month.

The HIPEs co-stabilized by the palm kernel oil ethoxylate and the soybean oil ethoxylate of Embodiment 5 are prepared by a homogenization at 45° C. and a 10000 rpm for 10 min, wherein the HIPEs have a constant oil-phase volume fraction of 83% (vol %), and 2.0% (wt %) of the oil ethoxylate composed of the palm kernel oil ethoxylate and the soybean oil ethoxylate at the ratios of 1:0.5, 1:1, and 1:2, respectively. FIG. 9 shows the optical microscopy image of the freshly prepared HIPE co-stabilized by the palm kernel oil ethoxylate and the soybean oil ethoxylate at the ratio of 1:1, and FIG. 10 shows the optical microscopy image of the HIPE co-stabilized by the palm kernel oil ethoxylate and the soybean oil ethoxylate at the ratio of 1:1 after the emulsion is placed for one month.

In accordance with the Safety and Technical Specifications for Cosmetics 2015 and the physical and chemical testing standards of GB/T 22965-2013 skin care lotion, a stability test of the HIPEs stabilized by oil ethoxylate is carried out. Table 1 shows the stability test results of the emulsions prepared in Embodiments 1-5.

TABLE 1

Stability test results of the HIPEs stabilized by oil ethoxylate

| Item | Embodiment 1 1-81 | Embodiment 2 0.6-81 | Embodiment 3 S-0.6-81 | Embodiment 4 SOE-N-60:SOE-C-60 = 1:1 | Embodiment 5 SOE-N-60:SOE-S-60 = 1:1 |
|---|---|---|---|---|---|
| heat-resistant test[1] | No abnormality | No abnormality | No abnormality | No abnormality | No abnormality |
| cold-resistant test[2] | No abnormality | No abnormality | No abnormality | No abnormality | No abnormality |

Notes:
[1] maintaining at (40 ± 1)° C. for 48 h, no obvious properly difference is found after returning to room temperature as compared to that before test
[2] maintaining at (−5 ± 1)° C. for 48 h, no obvious property difference is found after returning to room temperature as compared to that before test Finally, it should be illustrated that the above preferred embodiments are only used to illustrate the technical solutions of the invention and not to limit them. Although the invention has been described in detail through the above preferred embodiments, those skilled in the art can make equivalent substitutions or variations in form and details to the invention according to the technical solutions of the invention without departing from the scope defined by the claims of the invention.

What is claimed is:

1. A high internal phase emulsion stabilized by a low content of a surfactant, wherein the surfactant is an oil ethoxylate, and the oil ethoxylate accounts for 0.6-2.0 wt % of a total mass of the emulsion;
   wherein the oil ethoxylate comprises two selected from the group consisting of a palm kernel oil ethoxylate, a soybean oil ethoxylate, and a coconut oil ethoxylate, and a mass ratio of the selected two oil ethoxylates is (0.5-2):(0.5-2).

2. The high internal phase emulsion stabilized by a low content of a surfactant according to claim 1, wherein the selected two oil ethoxylates account for greater than or equal to 0.6% and smaller than 1 wt % of the total mass of the emulsion.

3. A method for preparing the high internal phase emulsion stabilized by a low content of a surfactant according to claim 1,
   the method comprising the following steps:
   (1) mixing the oil ethoxylate with a vegetable oil, and stirring at 10-50° C. until a resulting solution is mixed evenly;
   (2) adding water dropwise to the resulting solution of the oil ethoxylate and the vegetable oil under stirring to obtain a dispersed system; and
   (3) performing a homogenization on the obtained dispersed system by a high-shear dispersion emulsification homogenizer, to obtain the high internal phase emulsion.

4. The method for preparing the high internal phase emulsion stabilized by a low content of a surfactant according to claim 3, wherein the vegetable oil in step (1) is one selected from the group consisting of a soybean oil, a rapeseed oil, a coconut oil, an olive oil, a sunflower oil, a sesame oil, and a peanut oil.

5. The method for preparing the high internal phase emulsion stabilized by a low content of a surfactant according to claim 3, wherein a volume fraction of the vegetable oil in step (1) is 74-88 vol %.

6. The method for preparing the high internal phase emulsion stabilized by a low content of a surfactant according to claim 3, wherein process conditions in step (1) comprise: a temperature of 10-50° C., a speed of a low-speed stirring being 1000-4000 rpm, and a stirring time of 5-10 min.

7. The method for preparing the high internal phase emulsion stabilized by a low content of a surfactant according to claim 3, wherein a stirring speed in step (2) is 5000-8000 rpm, and the water is dropwise added to the resulting solution in step (1) at a speed of 0.4-0.8 mL/min.

8. The method for preparing the high internal phase emulsion stabilized by a low content of a surfactant according to claim 3, wherein the homogenization in step (3) is performed at 8000-12000 rpm for 8-15 min.

9. The method for preparing the high internal phase emulsion stabilized by a low content of a surfactant according to claim 3, wherein the high internal phase emulsion comprises an oil-phase volume fraction of 74-86 vol %.

\* \* \* \* \*